United States Patent [19]

Rapean et al.

[11] 3,860,497
[45] Jan. 14, 1975

[54] MULTI-STAGE DISTILLATION OF BICYCLOHEPTADIENE

[75] Inventors: John C. Rapean; Paul V. Shaw, both of Houston, Tex.

[73] Assignee: Shell Oil Company, Houston, Tex.

[22] Filed: May 2, 1973

[21] Appl. No.: 356,684

[52] U.S. Cl............................ 203/82, 260/666 PY
[51] Int. Cl........................... B01d 3/00, B01d 3/10
[58] Field of Search ...... 203/82, 68, 69; 260/666 A, 260/666 PY

[56] References Cited
UNITED STATES PATENTS

| | | | |
|---|---|---|---|
| 2,871,169 | 1/1959 | Martin | 203/82 |
| 2,875,256 | 2/1959 | Hyman et al. | 260/666 A |
| 2,966,527 | 12/1960 | Schmerling | 260/666 PY |
| 3,007,977 | 11/1961 | Hill et al. | 260/666 PY |
| 3,073,872 | 1/1963 | Reicheneder et al. | 260/666 PY |

FOREIGN PATENTS OR APPLICATIONS

| | | | |
|---|---|---|---|
| 254,868 | 8/1960 | Netherlands | 260/666 PY |
| 1,026,306 | 3/1958 | Germany | |
| 154,903 | 1/1954 | Australia | |

*Primary Examiner*—A. Louis Monacell
*Assistant Examiner*—Frank Sever
*Attorney, Agent, or Firm*—H. W. Haworth

[57] ABSTRACT

A continuous process for separating bicycloheptadiene from impurities of its production, which process comprises introducing bicycloheptadiene in admixture with said impurities into a first distillation zone, withdrawing as bottoms impurities less volatile than bicycloheptadiene, passing as overhead bicycloheptadiene together with more volatile impurities to a second distillation zone, withdrawing as overhead impurities more volatile than bicycloheptadiene, withdrawing bicyclohepatadiene as an intermediate fraction and recycling a bottoms fraction to said first distillation zone. The bicycloheptadiene product is useful for production of high energy fuels.

2 Claims, 1 Drawing Figure

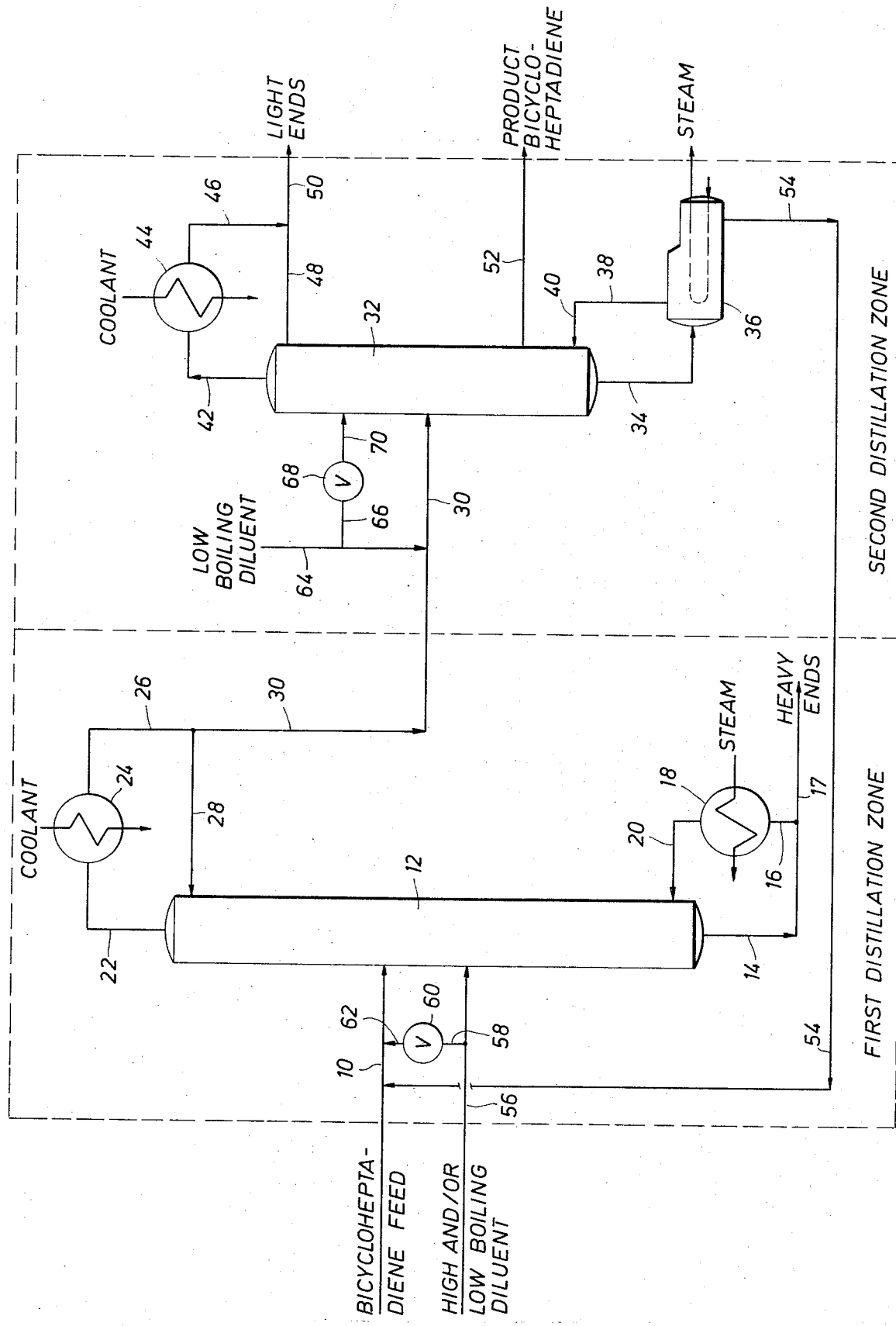

MULTI-STAGE DISTILLATION OF BICYCLOHEPTADIENE

BACKGROUND OF THE INVENTION

The invention herein described was made in the course of or under a contract or sub-contract thereunder with the United States Air Force.

This invention relates to separation of bicyclo-(2,2,1)-hepta-2,5-diene from the reaction products of the acetylene/cyclopentadiene condensation reaction. More particularly it relates to a processing sequence for separation of bicycloheptadiene from materials in the reaction products found to inhibit efficient catalytic oligimerization of said diene to high energy fuels.

As disclosed in U.S. Pat. No. 2,875,256 to Hyman et al, bicyclo-(2,2,1)-hepta-2,5-diene can be readily prepared by passing cyclopentadiene and acetylene through a hot reaction zone and the desired Diels-Alder product is obtained by fractionation.

The effluent from such a Diels-Alder bicycloheptadiene process contains in addition to the desired bicycloheptadiene product a variety of compounds such as cyclopentadiene, benzene, cycloheptatriene, toluene and dicyclopentadiene as well as other reaction products of acetylene and cyclopentadiene. Commercially available bicycloheptadiene has been found to contain up to about 15 different compounds in quantities ranging from about 0.001 to about 1.5 per cent by weight. Many of these compounds are not readily identifiable by conventional analytical techniques such as gas liquid chromatography and mass spectroscopy.

It is known from U.S. Pat. No. 3,282,663 to Muller et al, that high energy fuels having relatively high heats of combustion per unit volume, as well as relatively low melting points may be obtained by catalytic oligimerization of this monomeric diene. However, it has been found that some of the impurities of bicycloheptadiene production such as cyclopentadiene are extremely active inhibitors to the catalytic conversion of bicycloheptadiene to high energy fuels and the presence of small amounts of such contaminants, e.g., about 50 parts per million by weight results in inefficient, low conversion to high energy fuel.

Prior to the process of this invention, normal distillation processes to recover bicycloheptadiene capable of high conversion to high energy oligimers resulted in distillate of variable quality and required the sacrifice of substantial amounts of feed in order to achieve adequate removal of trace impurities. The purification is particularly difficult owing to the reactive nature of the desired product as well as of many of the impurities.

Bicycloheptadiene is a highly reactive olefinic liquid (boiling point 90°C) which in the absence of an appropriate inhibitor has been observed to self polymerize to an insoluble white powder after a few hours at room temperature. It is capable not only of undergoing further reaction with olefin-containing impurities, but of undergoing reversion to the precursor reactants. In addition, among the impurities, cyclopentadiene (boiling point 41°C) and dicyclopentadiene (boiling point 150°C) are a special problem owing to the conversion of each to the other under distillation conditions.

It has now been discovered that by first separating bicycloheptadiene from a heavy ends bottoms fraction of somewhat higher boiling contaminants including dicyclopentadiene and concentrating the cyclopentadiene in the bicycloheptadiene fraction by fractionation distillation, then fractionating the bicycloheptadiene fraction to separate a concentrate of cyclopentadiene and low boiling contaminants as a light ends fraction, to separate bicycloheptadiene as an intermediate fraction and to separate a bottoms fraction, and recycling the bottoms fraction to the first separation will result in efficient recovery of bicycloheptadiene and essentially remove contaminants including those which may be formed during the distillation process, which are inhibitory to the catalytic oligimerization of bicycloheptadiene.

SUMMARY OF THE INVENTION

The invention is a continuous process for separating bicycloheptadiene from impurities of its production by the acetylene/cyclopentadiene reaction which process comprises (a) introducing bicycloheptadiene together with said impurities into a first fractionation distillation zone; (b) withdrawing as bottoms impurities less volatile than bicycloheptadiene; (c) passing as overhead the bicycloheptadiene together with more volatile impurities to a second fractionation distillation zone; (d) withdrawing as overhead impurities more volatile than bicyclopentadiene; (e) withdrawing as an intermediate fraction product bicycloheptadiene; and (f) recycling bottoms from said second distillation zone to the first distillation zone.

BRIEF DESCRIPTION OF THE DRAWING

The FIGURE diagrammatically illustrates a preferred embodiment of the present invention. Shown therein are two distillation zones each comprising a distillation column, together with appurtenant reboiler and condenser, and their interconnections. Pieces of equipment such as pumps, surge vessels, accumulators and the like which are not essential for an understanding of the invention have been omitted for clarity.

DETAILED DESCRIPTION OF THE INVENTION

The process of this invention recovers bicycloheptadiene from the reaction product of acetylene and cyclopentadiene by distillation. Continuous separation of bicycloheptadiene from unreacted cyclopentadiene and from other impurities of its production is accomplished by first separating the bicycloheptadiene from less volatile components including dicyclopentadiene, then separating the bicycloheptadiene as an intermediate product from more volatile components including cyclopentadiene, and a fraction containing impurities heavier than bicycloheptadiene as may have been formed during the distillation process. By this method, impurities resulting from reactions occurring during the distillation process such as reversion (cracking) of dicyclopentadiene to generate additional cyclopentadiene, and reversion (dimerization) of cyclopentadiene to generate additional dicyclopentadiene may be avoided.

In a preferred embodiment, an inert liquid having an atmospheric boiling point between about 50° and about 80°C (hereafter a light diluent) and/or an inert liquid having an atmospheric boiling point between about 100°C and about 145°C (hereafter a heavy diluent) are added to the impure bicyclopentadiene prior to or during the separation process. The heavy diluent is added to the impure bicycloheptadiene prior to separation from the higher boiling, i.e., less volatile impurities. This heavy diluent, which may be blended with the impure bicycloheptadiene prior to introduction to the first distillation zone or introduced into the first distillation zone not later than separation of the less volatile impurities, will serve to reduce reversion (cracking) of dicyclopentadiene and possibly other higher boiling components as may be present. The inert heavy diluent is preferably a hydrocarbon liquid, which may be a $C_8$ or $C_9$ alkane such as octane or nonane or an alkyl benzene such as e.g., toluene, o-, m-, p-xylene or mixtures of these.

The light diluent is added to the impure bicycloheptadiene prior to separation of the more volatile impurities. This light diluent may be blended with the impure bicycloheptadiene together with or separately from the heavy diluent prior to introduction to the first distillation zone, or in the first distillation zone; or the light diluent solely may be added not later than separation of impurities more volatile than bicycloheptadiene in the second distillation zone. The added light diluent will serve to reduce reversion (dimerization) of the cyclopentadiene to dicyclopentadiene. The amount of inert liquid, i.e., heavy and/or light diluent may vary from about 1 to about 10 percent by weight based upon total feed to the distillation zone. Amounts greater than 10 percent by weight may be added but will, however, burden distillation capacity and/or otherwise add to the expense of the operation with little additional benefit.

Since the composition of the acetylene/cyclopentadiene reaction products may vary, the operating conditions within the two distillation zones should be adjusted accordingly in order to maintain substantial separation of the bicycloheptadiene from the higher boiling components as well as the lower boiling components. It is possible to operate the distillation zones at subatmospheric, atmospheric or superatmospheric pressure.

A fuller understanding of the inventive process can be obtained from the following description and accompanying schematic representation of a preferred embodiment of the invention.

In the FIGURE a feed containing bicycloheptadiene in admixture with other compounds in the reaction product of the vapor phase condensation of acetylene and cyclopentadiene is continuously passed via conduit 10 to a first distillation zone comprising distillation column 12, reboiler 18, and heat exchange means 24 and their interconnections. Distillation column 12 is operated at atmospheric pressure and is heated by means of reboiler 18 via conduits 14, 16 and 20. Within distillation column 12 having a tops temperature of 90°C and a bottoms temperature of 120°C, bicycloheptadiene is fractionated and separated from less volatile materials. Bottoms from distillation column 12 containing impurities less volatile than bicycloheptadiene such as, e.g., dicyclopentadiene, cycloheptadiene, traces of polymer and the like are withdrawn from said first distillation zone via conduits 14 and 17. The overhead vapors from distillation column 12 are passed through conduit 22, cooled by heat exchange means 24 and refluxed to distillation column 12 through conduit 28 via conduit 26, while a portion is passed as a bicycloheptadiene-containing fraction through conduit 30 via conduit 26 to a second distillation zone. Said second distillation zone comprises distillation column 32, reboiler 36, heat exchange means 44 and their interconnections.

Distillation column 32, at atmospheric pressure, is heated by means of reboiler 36 via conduits 34, 38 and 40. Within distillation column 32 having a tops temperature of 70°C and a bottoms temperature of 95°C the bicycloheptadiene is fractionated and separated from more volatile materials. It has been observed that small amounts of water present in the feed to the first distillation column 12 is largely separated with the more volatile materials in distillation column 32, possibly owing to the formation of an azeotrope. The overhead vapors from distillation column 32 are passed through conduit 42, heat exchange means 44 and refluxed to distillation column 32, through conduit 48 via conduit 46, while a portion is withdrawn from the distillation zone via conduit 50. The overhead (light ends) removed via conduit 50 contains cyclopentadiene, water, benzene, and other low boiling components of the acetylene/cyclopentadiene reaction effluent. Product bicycloheptadiene essentially free from harmful amounts of impurities is withdrawn from said second distillation zone as an intermediate product, via conduit 52. Bottoms material from this second distillation zone, present, e.g., in reboiler 36 is recycled to the first distillation zone through conduit 10 via conduit 54. This recycle of bottoms material enables separation in distillation column 12 of any less volatile impurities, such as, e.g., bicycloheptadiene polymer or dicyclopentadiene, as may be formed in the distillation zones, so as to prevent any problem of possible buildup of these in reboiler 36.

In another preferred embodiment an inert diluent having a boiling point in the range from 100° to about 145°C is added to the first distillation zone. This diluent which is preferably an inert hydrocarbon, e.g., an alkane, or aromatic liquid such as toluene may be introduced to first distillation column 12, via directly via conduits 56 and 57 or as a blend with impure bicycloheptadiene fee. If addition as a blend is desired, the diluent may of course be preblended with the feed or conveniently mixed in conduit 10 via conduits 56 and 58, valve 60, and conduit 62. When introduced into column 12, the diluent under operating conditions will fractionate and separate with the less volatile high boiling components (heavy ends) removed through conduit 18 via conduit 14, and can be sent to storage or to further separation for recovery and reuse. A distinct advantage by the use of said diluent is to maintain substantial separation of the bicycloheptadiene product and the higher boiling materials within the column, as well as to reduce the tendency for dicyclopentadiene and possibly other materials in the feed to undergo reversion (cracking) in the first distillation zone.

What is claimed is:

1. A continuous process for separating bicyclo-(2,2,1)-hepta-2,5-diene from cyclopentadiene, dicyclopentadiene and other impurities of its production by the acetylene/cyclopentadiene condensation reaction which process comprises
   a. introducing said bicycloheptadiene together with said impurities into a first fractionation distillation zone,
   b. introducing into the first distillation zone an inert hydrocarbon diluent mixture of one or more of the hydrocarbons selected from the group consisting of $C_8$ alkanes, $C_9$ alkanes, toluene, ortho-xylene, para-xylene, and meta-xylene,
   c. withdrawing as bottoms dicyclopentadiene and other impurities less volatile than said bicycloheptadiene, d. passing as overhead said bicycloheptadiene together with more volatile impurities to a second fraction distillation zone, e. withdrawing as overhead cyclopentadiene and other impurities more volatile than said bicycloheptadiene, f. withdrawing as an intermediate product said bicycloheptadiene, and g. recycling bottoms from said second distillation zone to the first distillation zone.

2. A process as in claim 1 wherein said diluent is selected from the group consisting of toluene, ortho-xylene, meta-xylene, para-xylene or mixtures thereof.

* * * * *